US012782139B2

(12) United States Patent
Aiba

(10) Patent No.: US 12,782,139 B2
(45) Date of Patent: Nov. 3, 2026

(54) POSITION MEASUREMENT APPARATUS, POSITION MEASUREMENT METHOD, PROGRAM, AND STORAGE DEVICE

(71) Applicant: HONDA MOTOR CO., LTD., Tokyo (JP)

(72) Inventor: Futoshi Aiba, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 9 days.

(21) Appl. No.: 18/894,044

(22) Filed: Sep. 24, 2024

(65) Prior Publication Data

US 2025/0109942 A1 Apr. 3, 2025

(30) Foreign Application Priority Data

Sep. 28, 2023 (JP) ................................ 2023-167568

(51) Int. Cl.
*G01C 21/16* (2006.01)

(52) U.S. Cl.
CPC .................................. *G01C 21/165* (2013.01)

(58) Field of Classification Search
CPC ...... G01C 21/28; G01C 21/16; G01C 21/165; G01C 21/1656; G01C 21/188; G01S 19/47
See application file for complete search history.

(56) References Cited

FOREIGN PATENT DOCUMENTS

| | | | | |
|---|---|---|---|---|
| CN | 111780755 A | * 10/2020 | ............. | G01S 19/49 |
| CN | 111862316 A | * 10/2020 | ............. | G06T 7/344 |
| CN | 116105721 A | * 5/2023 | ......... | G01C 21/3804 |
| JP | 2009-041932 | 2/2009 | | |

OTHER PUBLICATIONS

Machine Translation of Foreign Reference: CN111780755A—Zhu et al. (Year: 2020).*
Machine Translation of Foreign Reference: CN116105721A—Gao (Year: 2023).*
Machine Translation of Foreign Reference: CN111862316A—Wu et al. (Year: 2020).*

* cited by examiner

*Primary Examiner* — Scott A Browne
*Assistant Examiner* — Rami Nabih Bedewi
(74) *Attorney, Agent, or Firm* — Amin, Turocy & Watson, LLP

(57) ABSTRACT

A position measurement apparatus includes a position measurement signal reception portion, an object detection portion, an inertia detection portion, a first position estimation portion, a second position estimation portion, an inertial navigation process portion, and an information integration portion. The inertial navigation process portion outputs third information of a time series of a movable body by inertial navigation based on inertia information from the inertia detection portion. The first position estimation portion and the second position estimation portion output first information and second information by a position measurement based on information from the position measurement signal reception portion and the object detection portion. The information integration portion forms a pose graph using the first information and the second information that relatively constrain a predetermined zone of a plurality of third information of the time series, by optimization of a loop confinement, and outputs a systematic error of the third information.

6 Claims, 4 Drawing Sheets

POSITION MEASUREMENT APPARATUS, POSITION MEASUREMENT METHOD, PROGRAM, AND STORAGE DEVICE

CROSS-REFERENCE TO RELATED APPLICATION

Priority is claimed on Japanese Patent Application No. 2023-167568, filed on Sep. 28, 2023, the contents of which are incorporated herein by reference.

BACKGROUND

Field of the Invention

The present invention relates to a position measurement apparatus, a position measurement method, a program, and a storage device.

Background

In the related art, for example, a position measurement apparatus is known which corrects an error of an inertial measurement unit mounted on a movable body on the basis of a difference between a position of the movable body obtained by inertial navigation and a position of the movable body obtained by satellite navigation (for example, refer to Japanese Unexamined Patent Application, First Publication No. 2009-41932).

SUMMARY

In the position measurement apparatus of the related art described above, the difference between the positions by the position measurement of the inertial navigation and the satellite navigation is calculated in a temporally synchronized state. However, I even when measurement timings are the same time as each other, the timings of acquiring each of data that is output from the inertial measurement unit and a position measurement signal that is output from a satellite may not match each other, and there is a possibility that a deviation in a correspondence relationship between the position by the inertial navigation and the position by the satellite navigation may occur.

An aspect of the present invention aims to provide a position measurement apparatus, a position measurement method, a program, and a storage device capable of improving a position measurement accuracy.

A position measurement apparatus according to a first aspect of the present invention includes: an inertia detection portion that is provided on a movable body and outputs inertia information; an inertial navigation process portion that outputs first state information of a time series of the movable body by inertial navigation based on the inertia information; a detection information output portion that outputs detection information relating to the first state information; a position measurement process portion that outputs second state information of the movable body by a position measurement based on the detection information; and an integration process portion that forms a pose graph using the first state information and the second state information that relatively constrains the first state information in a predetermined zone of the time series and outputs a systematic error of the first state information by optimization of a loop confinement in the predetermined zone.

A second aspect is the position measurement apparatus according to the first aspect described above, wherein the integration process portion may control a weighting of the first state information and the second state information in accordance with a length of the predetermined zone.

A third aspect is the position measurement apparatus according to the first or second aspect described above, wherein the position measurement process portion may include at least one of a first position measurement process portion and a second position measurement process portion, the first position measurement process portion may output the second state information by a position measurement based on a position measurement signal acquired from the outside, and the second position measurement process portion may output the second state information by a position measurement based on point group information obtained in accordance with detection of an external object.

A position measurement method according to a fourth aspect of the present invention is a position measurement method executed by an electronic device including a process part that acquires state information of a movable body, the position measurement method including: outputting first state information of a time series of the movable body by inertial navigation based on inertia information that is output from an inertia detection portion provided on the movable body; outputting second state information of the movable body by a position measurement based on detection information relating to the first state information; and forming a pose graph using the first state information and the second state information that relatively constrains the first state information in a predetermined zone of the time series and outputting a systematic error of the first state information by optimization of a loop confinement in the predetermined zone.

A fifth aspect of the present invention is a computer-readable non-transitory recording medium that includes a program causing a computer of an electronic device including a process part that acquires state information of a movable body to execute: outputting first state information of a time series of the movable body by inertial navigation based on inertia information that is output from an inertia detection portion provided on the movable body; outputting second state information of the movable body by a position measurement based on detection information relating to the first state information; and forming a pose graph using the first state information and the second state information that relatively constrains the first state information in a predetermined zone of the time series and outputting a systematic error of the first state information by optimization of a loop confinement in the predetermined zone.

A storage device according to a sixth aspect of the present invention is a computer-readable storage device that stores the program according to the fifth aspect described above.

According to the first aspect described above, by including the integration process portion that performs optimization of the loop confinement using the pose graph formed by the second state information that relatively constrains the first state information in the predetermined zone, it is possible appropriately acquire the systematic error of the first state information. By the optimization of the loop confinement, it is possible to prevent a time accuracy and synchronicity required for the first state information and the second state information from becoming high and prevent a high-performance costly inertia detection portion from being required.

In the case of the second aspect described above, by including the integration process portion that controls the weighting of the first state information and the second state information in accordance with the length of the predetermined zone, it is possible to acquire the systematic error of the first state information with high accuracy.

In the case of the third aspect described above, by including at least one of the first position measurement process portion and the second position measurement process portion, it is possible to improve robustness with respect to a motion environment of the movable body. For example, when an accuracy decrease, reception difficulty, or the like of the position measurement signal occurs depending on the motion environment of the movable body, for example, even when the position measurement based on the point group information becomes complicated or complex in response to a frequent change or the like of the motion environment of the movable body or the like, it is possible to appropriately acquire the systematic error of the first state information.

According to the fourth, fifth, or sixth aspect described above, by performing optimization of the loop confinement using the pose graph formed by the second state information that relatively constrains the first state information in the predetermined zone, it is possible appropriately acquire the systematic error of the first state information. By the optimization of the loop confinement, it is possible to prevent a time accuracy and synchronicity required for the first state information and the second state information from becoming high and prevent a high-performance costly inertia detection portion from being required.

DESCRIPTION OF EMBODIMENTS

Hereinafter, a position measurement apparatus and a position measurement method according to an embodiment of the present invention will be described with reference to the accompanying drawings.

A position measurement apparatus of an embodiment acquires information of a position and an attitude of a movable body. The movable body is, for example, a manned or unmanned vehicle, a movable work machine that performs predetermined work while moving, a robot, and the like. The movable body performs, for example, automatic or autonomous movement, movement in response to a manual operation (for example, a remote operation or the like) of an operator, movement in response to a drive operation of an occupant, or the like.

Figure 1:
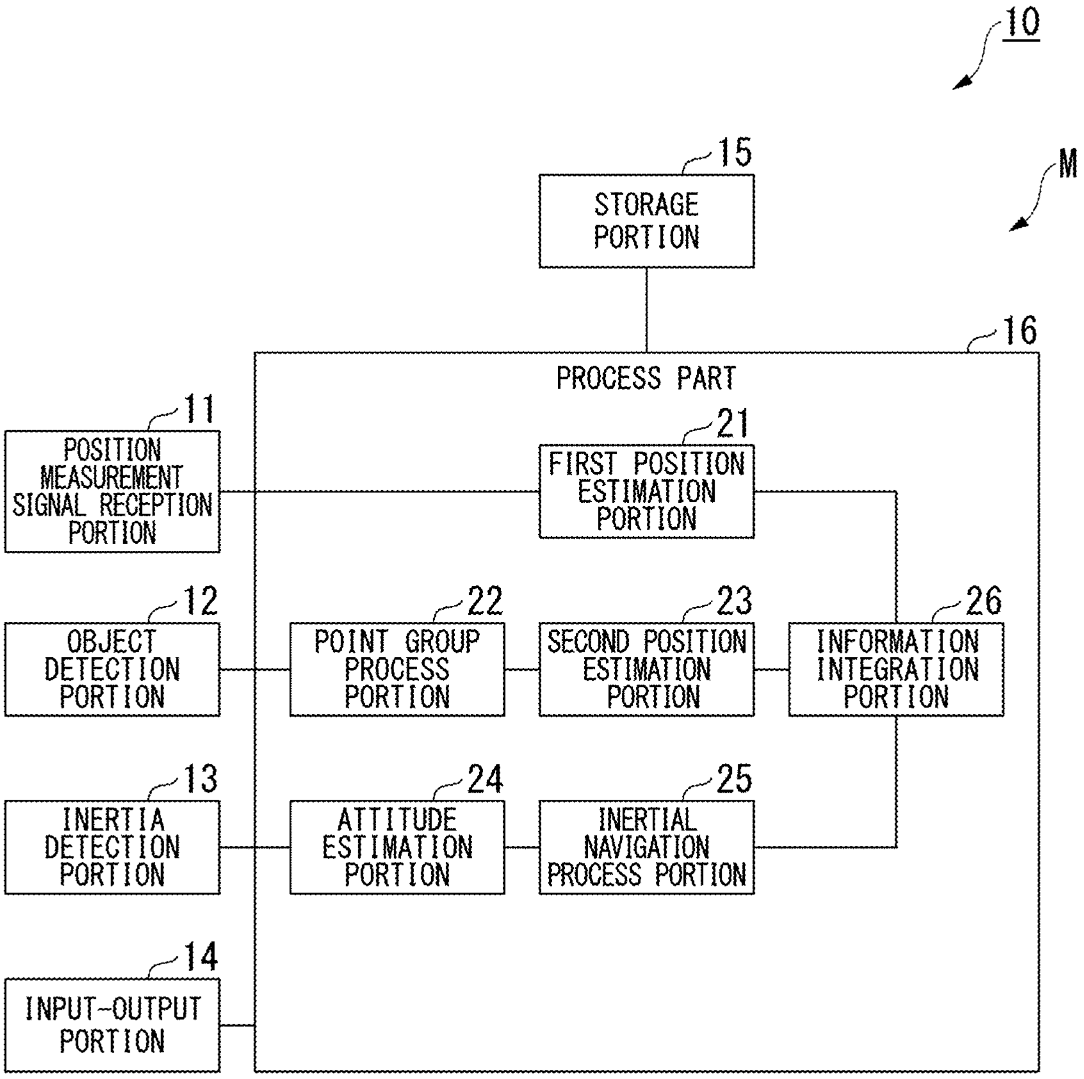
FIG. 1 is a block diagram showing a functional configuration of a position measurement apparatus according to an embodiment of the present invention.

FIG. 1 is a block diagram showing a functional configuration of a position measurement apparatus (electronic device) according to the embodiment.

As shown in FIG. 1, a position measurement apparatus 10 provided on a movable body M includes, for example, a position measurement signal reception portion 11 (detection information output portion), an object detection portion 12 (detection information output portion), an inertia detection portion 13, an input-output portion 14, a storage portion 15, and a process part 16. The process part 16 includes, for example, a first position estimation portion 21 (a position measurement process portion, a first position measurement process portion), a point group process portion 22, a second position estimation portion 23 (a position measurement process portion, a second position measurement process portion), an attitude estimation portion 24, an inertial navigation process portion 25, and an information integration portion 26.

The position measurement signal reception portion 11 includes, for example, an antenna used for a satellite position measurement system (GNSS: Global Navigation Satellite System) such as a GPS (Global Positioning System). The position measurement signal reception portion 11 outputs, for example, predetermined information obtained from a position measurement signal received by the antenna or information of a position, an attitude, and the like obtained by a predetermined calculation based on the position measurement signal to the first position estimation portion 21.

The object detection portion 12 is, for example, a sonar, a radar device, a finder, and the like and acquires three-dimensional point group data. The finder is, for example, a LIDAR (Light Detection and Ranging or Laser Imaging Detection and Ranging).

The object detection portion 12 emits, for example, ultrasonic waves, electromagnetic waves, or light to the vicinity of a target object and detects a distance to the object, a position of the object, or the like by detecting reflection or scattering by the object. The object detection portion 12 acquires an aggregation (point group data) of points having position information, for example, by scanning with respect to the object in a three-dimensional space. The object detection portion 12 outputs the acquired point group data to the point group process portion 22.

The inertia detection portion 13 is, for example, an inertial measurement unit (IMU: Inertial Measurement Unit) or the like and detects an inertial motion of a movable body M. The inertia detection portion 13 includes, for example, an acceleration sensor that detects an acceleration of the movable body M and a gyro sensor that detects an angular speed of the movable body M. The inertia detection portion 13 outputs inertia information obtained by the detection to the attitude estimation portion 24.

The input-output portion 14 includes, for example, an input-output device as a user interface, a connection terminal connected to a variety of external devices, and the like. Examples of the input-output device include a display device such as a liquid crystal display or an organic EL (Electro Luminescence) display, an input device such as a button or a touch panel that receives an input operation by an operator's finger, a microphone for audio input, a speaker for sound output, and the like.

The storage portion 15 stores, for example, a variety of information, a predetermined program, and the like.

The process part 16 includes, for example, a software function unit that functions by a predetermined program being executed by a processor such as a CPU (Central Processing Unit). The software function unit is an ECU (Electronic Control Unit) that includes the processor such as a CPU, a ROM (Read-Only Memory) that stores the program, a RAM (Random-Access Memory) that temporarily stores data, and an electronic circuit such as a timer. At least part of the process part 16 may be an integrated circuit such as a LSI (Large-Scale Integration).

The process part 16 acquires information of a position, an attitude, and the like of the movable body M, for example, by performing a variety of calculation processes on the basis of information acquired from the position measurement signal reception portion 11, the object detection portion 12, the inertia detection portion 13, the input-output portion 14, and the storage portion 15.

The first position estimation portion 21 acquires information (first information) of the position, the attitude, and the like of the movable body M by a predetermined position measurement based on the information acquired from the position measurement signal reception portion 11. The first position estimation portion 21 outputs the acquired first information to the storage portion 15, the information integration portion 26, or the like.

The point group process portion 22 performs so-called scan matching by comparing point group data acquired from the object detection portion 12 with point group data (point group map) used for reference and acquired in advance. The point group process portion 22 acquires a relative displacement (displacement of the position, the attitude, and the like) between the different point group data by the scan matching. The point group process portion 22 outputs the acquired relative displacement to the second position estimation portion 23.

The second position estimation portion 23 acquires information (second information) of the position, the attitude, and the like of the movable body M by a predetermined position measurement based on the point group data and the relative displacement acquired from the point group process portion 22. The second position estimation portion 23 outputs the acquired second information to the storage portion 15, the information integration portion 26, or the like.

The attitude estimation portion 24 acquires information of the attitude of the movable body M by a predetermined calculation based on the inertia information acquired from the inertia detection portion 13 or the like. The attitude estimation portion 24 calculates an attitude angle (a roll angle and a pitch angle) and an azimuth angle (a yaw angle) of the movable body M, for example, on the basis of a three-axis acceleration and a three-axis angular speed. The attitude estimation portion 24 outputs the acquired information of the attitude to the inertial navigation process portion 25.

The inertial navigation process portion 25 acquires information (third information) of a position, a speed, an attitude, and the like of the movable body M by a predetermined inertial navigation calculation or the like based on the information of the attitude of the movable body M acquired from the attitude estimation portion 24. The inertial navigation process portion 25 acquires the third information by the inertial navigation calculation or the like, for example, at each time when a state change by a change of a movement distance or an attitude angle of the movable body M or the like becomes a predetermined value or more. The inertial navigation process portion 25 outputs the acquired third information to the storage portion 15, the information integration portion 26, or the like.

The information integration portion 26 integrates, for example, information of the position, the attitude, and the like of the movable body M output from each of the first position estimation portion 21, the second position estimation portion 23, and the inertial navigation process portion 25. The information integration portion 26 corrects, for example, time-series third information (first state information) acquired by the inertial navigation process portion 25 by the first information (second state information) and the second information (second state information).

Figure 2:
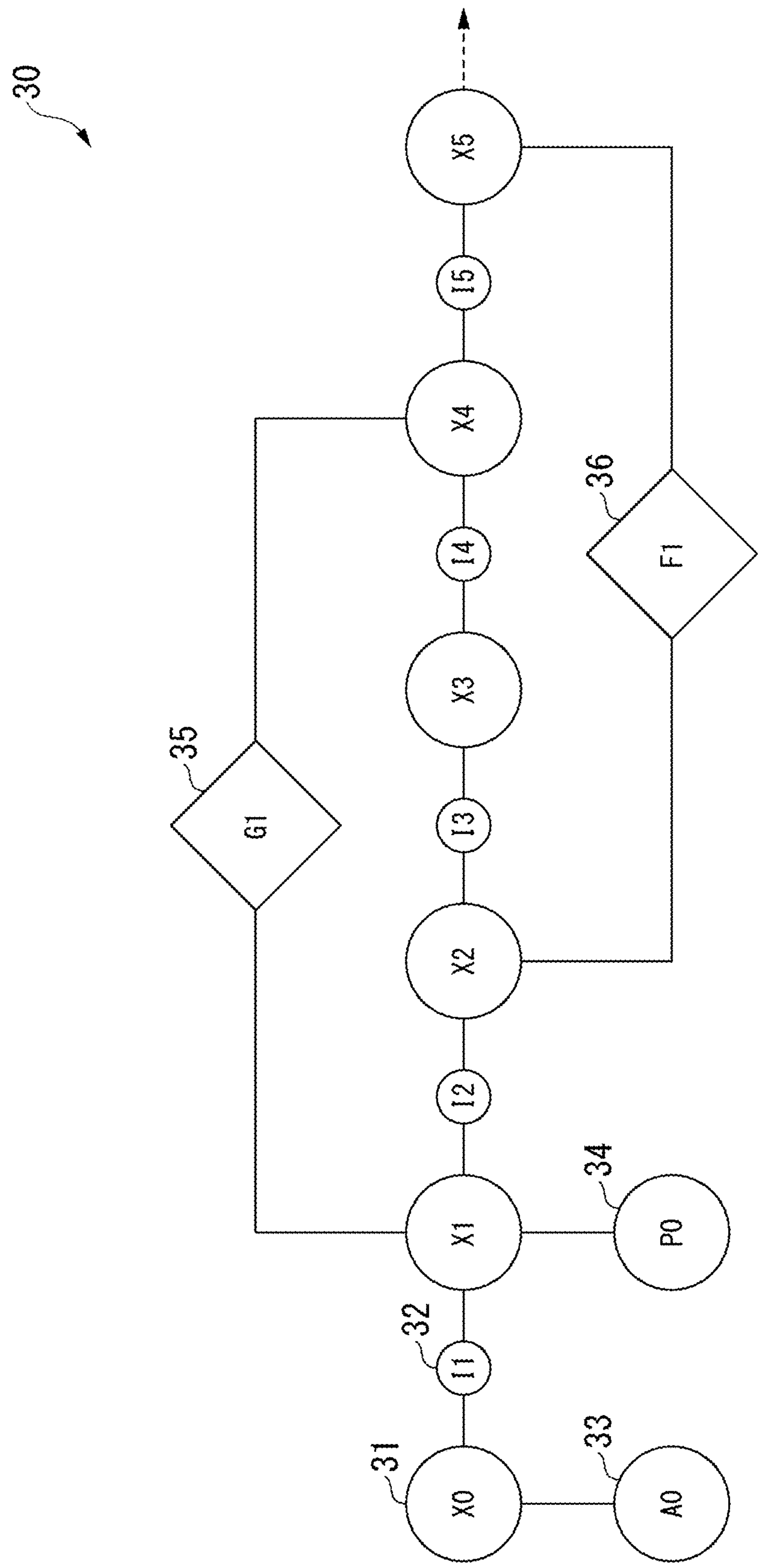
FIG. 2 is a view showing an example of a pose graph formed by the position measurement apparatus according to the embodiment of the present invention.

FIG. 2 is a view showing an example of a pose graph 30 formed by the position measurement apparatus 10 of the embodiment.

As shown in FIG. 2, the information integration portion 26 acquires a systematic error of the third information, for example, by an optimization process of the pose graph 30. The pose graph 30 includes, for example, a plurality of nodes 31, a plurality of internode factors (between factor) 32, a prior factor 33, a pseudo factor 34, a first loop confinement factor (first factor) 35, and a second loop confinement factor (second factor) 36.

The plurality of nodes 31 are associated with a plurality of third information (for example, attitude state amounts X0, X1, X2, X3, X4, X5 . . . relating to the attitude of the movable body M) obtained in a time series.

The plurality of internode factors 32 connect the nodes 31 adjacent to each other in the time series. Each of the plurality of internode factors 32 relatively constrains the adjacent nodes 31. Each of the plurality of internode factors 32 is associated with, for example, integration information (for example, integration information I1, I2, I3, I4, I5 . . . ) obtained by integration of inertia information output from the inertia detection portion 13. The integration information is, for example, information used in a predetermined inertial navigation calculation or the like by the inertial navigation process portion 25.

For example, in the case of the attitude state amounts X0, X1 adjacent to each other in the time series, a current attitude state amount X1 is obtained by an attitude state amount X0 obtained last time and integration information I1 obtained this time.

The prior factor 33 absolutely constrains, for example, the prior node 31 associated with the attitude state amount X0. The prior factor 33 defines the attitude state amount X0, for example, by the information (for example, attitude information A0 or the like) relating to the attitude of the movable body M acquired based on the inertia information (for example, information output from the acceleration sensor or the like) output from the inertia detection portion 13.

The pseudo factor 34 absolutely constrains, for example, the node 31 (the node 31 associated with the attitude state amount X1) adjacent to the prior node 31 in the time series. The pseudo factor 34 defines the attitude state amount X1, for example, by integration information (for example, integration information P0 or the like) obtained by integration of the inertia information (for example, information output from the gyro sensor or the like) output from the inertia detection portion 13.

By a loop set in a predetermined zone (first zone) of the plurality of nodes 31 arranged in the time series, the first loop confinement factor (first factor) 35 relatively constrains the nodes 31 in the first zone. The first factor 35 constrains a change amount of the attitude state amount of the node 31 in the first zone, for example, by a change amount of the first information (for example, the information relating to the attitude of the movable body M or the like) corresponding to the first zone.

For example, in an example shown in FIG. 2, the first zone is set between the node 31 of the attitude state amount X1 and the node 31 of the attitude state amount X4. The first factor 35 has a change amount G1 between the first information at the same time as the attitude state amount X1 and the first information at the same time as the attitude state amount X4. The first information at the same time is, for example, information obtained by measuring the state of the movable body M at the same time, and corresponds to that a timing at which the inertia detection portion 13 detects the position, the attitude, and the like of the movable body M is identical to a timing at which the position measurement signal received by the position measurement signal reception portion 11 is transmitted from a satellite or the like.

By a loop set in a predetermined zone (second zone) of the plurality of nodes 31 arranged in the time series, the second loop confinement factor (second factor) 36 relatively constrains the nodes 31 in the second zone. The second factor 36 constrains a change amount of the attitude state amount of the node 31 in the second zone, for example, by a change amount of the second information (for example, the information relating to the attitude of the movable body M or the like) corresponding to the second zone.

For example, in an example shown in FIG. 2, the second zone is set between the node 31 of the attitude state amount X2 and the node 31 of the attitude state amount X5. The second factor 36 has a change amount F1 between the second information at the same time as the attitude state amount X2 and the second information at the same time as the attitude state amount X5. The second information at the same time is, for example, information obtained by measuring the state of the movable body M at the same time, and corresponds to that a timing at which the inertia detection portion 13 detects the position, the attitude, and the like of the movable body M is identical to a timing at which the object detection portion 12 acquires the point group data.

The information integration portion 26 sets, for example, a predetermined lower limit threshold value with respect to lengths of the first zone and the second zone and sets the length of each of the first zone and the second zone to a value that is equal to or more than the predetermined lower limit threshold value. The predetermined lower limit threshold value is, for example, a length of a zone to a degree in which a time error between the first and second information and the third information (for example, a time deviation when these information are recognized as information at the same time as each other or the like) can be ignored.

The information integration portion 26 controls the weighting of the first information, the second information, and the third information, for example, in accordance with the lengths of the first zone and the second zone. The information integration portion 26 controls the weighting, for example, in response to the errors of the first information and the second information being substantially constant regardless of a time change amount while the error of the third information changes in accordance with the time change amount. The information integration portion 26 controls the weighting, for example, such that the third information is prioritized as the length of each zone becomes shorter and such that the first information and the second information are prioritized as the length of each zone becomes longer.

The information integration portion 26 acquires the systematic error of the attitude state amount (third information), for example, by the optimization process of the predetermined loop confinement in each of the first zone and the second zone of the pose graph 30. The information integration portion 26 corrects the attitude state amount of the node 31 of each of the first zone and the second zone in accordance with the systematic error acquired by the optimization process.

Figure 3:
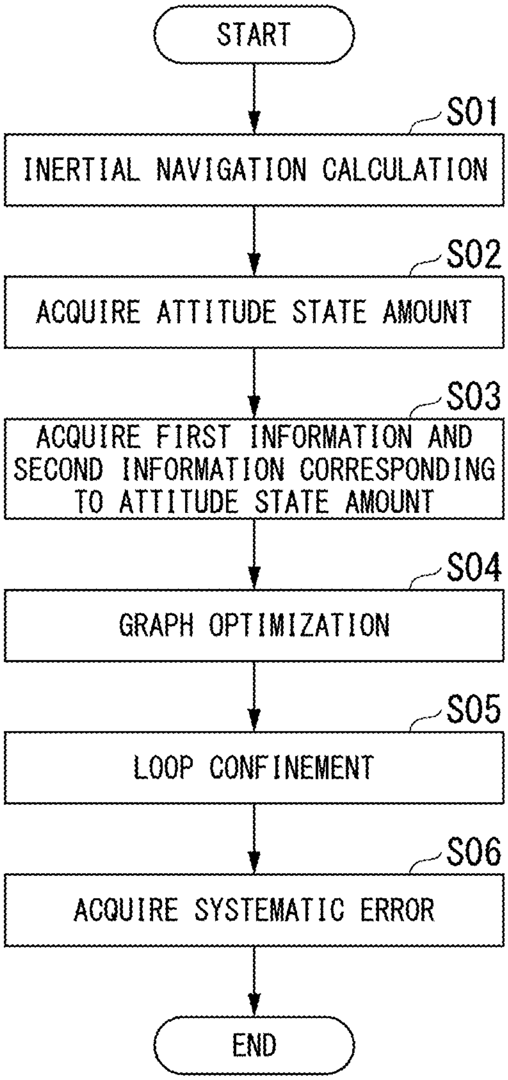
FIG. 3 is a flowchart showing an operation of the position measurement apparatus in the embodiment of the present invention.

FIG. 3 is a flowchart showing an operation of the position measurement apparatus 10 in the embodiment.

First, in Step S01 shown in FIG. 3, the information integration portion 26 acquires the third information that is output by the inertial navigation calculation of the inertial navigation process portion 25 which is sequentially performed at an appropriate timing.

Next, in Step S02, the information integration portion 26 acquires the attitude state amount of the movable body M associated with each node 31 of the pose graph 30 on the basis of the acquired third information.

Next, in Step S03, the information integration portion 26 extracts each of the first information and the second information which are recognized as information at the same time with respect to the attitude state amount of the appropriate node 31 in order to set an appropriate first zone and an appropriate second zone for the plurality of nodes 31 arranged in a time series in the pose graph 30.

Next, in Step S04, the information integration portion 26 performs a predetermined graph optimization process on each of the first zone and the second zone.

Next, in Step S05, the information integration portion 26 performs a predetermined loop confinement optimization process on each of the first zone and the second zone.

Next, in Step S06, the information integration portion 26 corrects the attitude state amount of the node 31 in each of the first zone and the second zone in accordance with the systematic error of the attitude state amount (third information) acquired by the optimization process. Then, the information integration portion 26 advances the process to the end.

Figure 4:
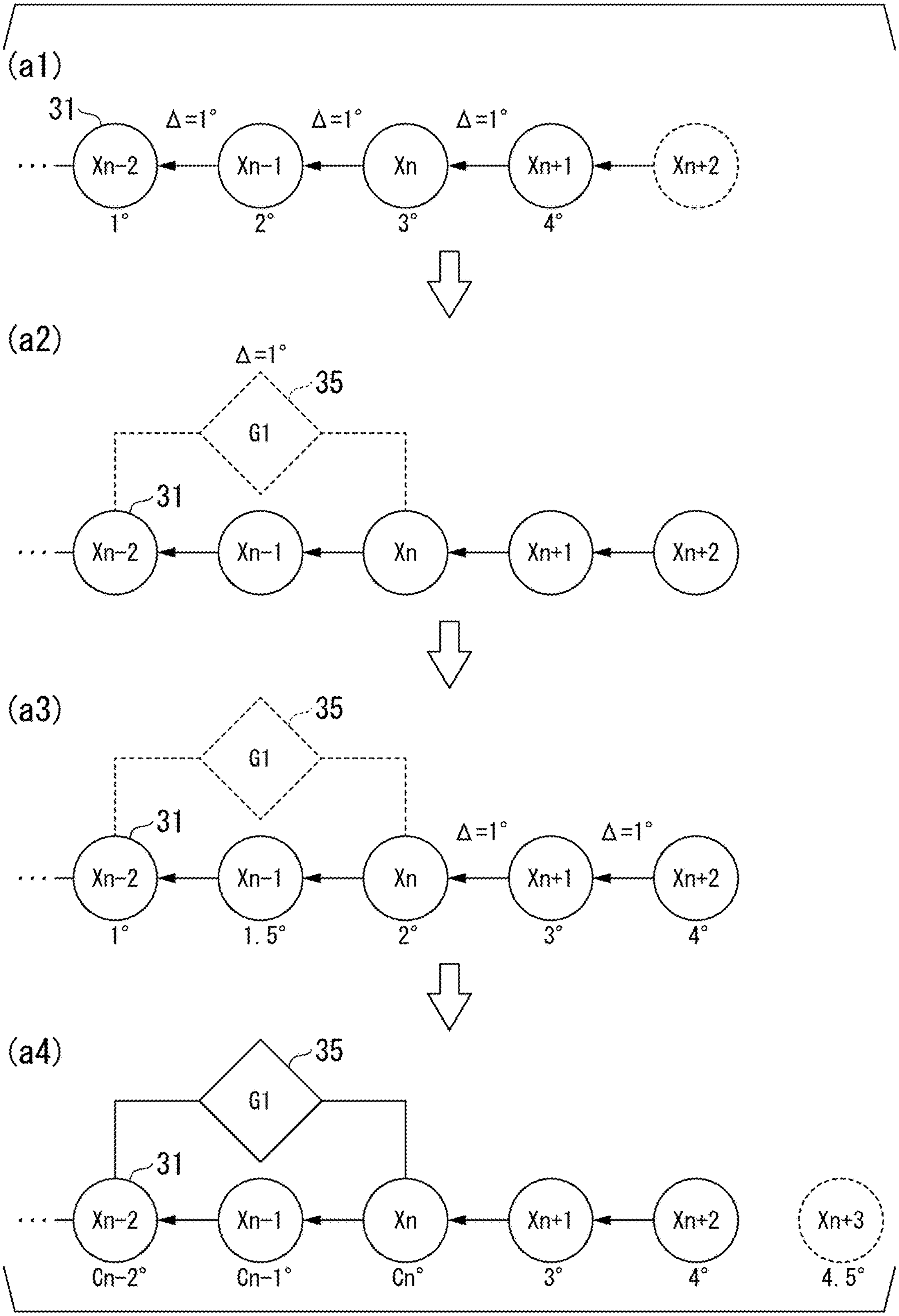
FIG. 4 is a view schematically showing an example of an optimization process by the position measurement apparatus according to the embodiment of the present invention.

FIG. 4 is a view schematically showing an example of an optimization process by the position measurement apparatus 10 of the embodiment.

A first state a1 in an example shown in FIG. 4 is a state in which attitude state amounts (for example, information of the angle) with respect to the plurality of nodes 31 are acquired in accordance with the third information sequentially output from the inertial navigation process portion 25. Toward an attitude state amount Xn+2 at this time point, four attitude state amounts Xn−1, Xn, Xn+1, Xn+2 are sequentially acquired from an appropriate previous attitude state amount Xn−2. A change amount Δ of the attitude state amounts adjacent to each other in the time series is, for example, 1° (the change amount Δ=1°), and a plurality of attitude state amounts Xn−2, Xn−1, Xn, Xn+1 are, for example, sequentially 1° (the attitude state amount Xn−2=1°), 2° (the attitude state amount Xn−1=2°), 3° (the attitude state amount Xn=3°), and 4° (the attitude state amount Xn+1=4°).

A second state a2 is a state in which a loop by the first factor 35 is set in a zone (first zone) between the attitude state amount Xn−2 and the attitude state amount Xn in response to extraction of the first information recognized as information at the same time for each of the attitude state amount Xn−2 and the attitude state amount Xn among the plurality of nodes 31 arranged in the time series. The first factor 35 is associated with a change amount G1 between the first information at the same time as the attitude state amount Xn−2 and the first information at the same time as the attitude state amount Xn, and the change amount G1 is, for example, 1° (G1=Δ=1°). The change amount G1 of the first information corresponds to, for example, the amount of two times at which the attitude state amount Xn−1 and the attitude state amount Xn are acquired sequentially from the attitude state amount Xn−2. The change amount ΔG of the first information between the attitude state amount Xn−2 and the attitude state amount Xn−1 and between the attitude state amount Xn−1 and the attitude state amount Xn is, for example, 0.5° (ΔG=0.5°).

A third state a3 is a state in which a predetermined graph optimization process has been performed. First, among the attitude state amounts Xn−2, Xn−1, Xn of the first zone, each of the attitude state amounts Xn−1, Xn is corrected by the change amount ΔG (=0.5°) of the first information. The attitude state amounts Xn−1, Xn after the correction are, for example, sequentially 1.5° (the attitude state amount Xn−1=2°−0.5°=1.5°) and 2° (the attitude state amount Xn=3°−0.5°−0.5°=2°), respectively.

Next, each of the attitude state amounts Xn+1, Xn+2 after the first zone is corrected in accordance with the attitude state amount Xn after the correction in a state where the change amount Δ(=1°) of the attitude state amount in the first state a1 is maintained. The attitude state amounts Xn+1, Xn+2 are, for example, sequentially 3° (the attitude state amount Xn+1=2°+1°=3°) and 4° (the attitude state amount Xn+2=3°+1°=4°), respectively.

A fourth state a4 is a state in which a predetermined loop confinement optimization process has been performed in the first zone. Each attitude state amount Xn−2, Xn−1, Xn of the node 31 of the first zone is corrected in accordance with the systematic error of the attitude state amount (third information) acquired by the optimization process. The attitude state amounts Xn−2, Xn−1, Xn after the correction are, for example, sequentially Cn−2°, Cn−1°, Cn° by an appropriate real number. Further, since the systematic error is not acquired other than in the first zone, for example, a newly acquired attitude state amount Xn+3 is 4.5° (the attitude state amount Xn+3=4°+1°−0.5°=4.5°) in accordance with the immediate attitude state amount Xn+2 (=4°), the change amount Δ(=1°) of the attitude state amount in the first state a1, and the change amount ΔG (=0.5°) of the first information in the second state a2.

As described above, according to the position measurement apparatus 10 and the position measurement method of the embodiment, by including the information integration portion 26 that performs an optimization process of the loop confinement in the first zone and the second zone of the pose graph 30, it is possible appropriately acquire the systematic error of the third information. By the optimization of the loop confinement, it is possible to prevent a time accuracy and synchronicity required for the first information, the second information, and the third information from becoming high and prevent a high-performance costly inertia detection portion 13 from being required.

By including the information integration portion 26 that controls the weighting of the third information and the first and second information in accordance with the length of the predetermined zone for which the loop of the pose graph 30 is set, it is possible to acquire the systematic error of the third information with high accuracy.

By including the object detection portion 12 and the inertia detection portion 13, it is possible to improve robustness with respect to a motion environment of the movable body M. For example, when an accuracy decrease, reception difficulty, or the like of the position measurement signal occurs depending on the motion environment of the movable body M, for example, even when the position measurement based on the point group information becomes complicated or complex in response to a frequent change or the like of the motion environment of the movable body M or the like, it is possible to appropriately acquire the systematic error of the third information.

Modification Example

Hereinafter, modification examples of the embodiment are described. The same parts as those of the embodiments described above are denoted by the same reference numerals, and description thereof are omitted or simplified.

The above embodiment is described using an example in which the information integration portion 26 corrects the time-series third information acquired by the inertial navigation process portion 25 by the first information and the second information; however, the embodiment is not limited thereto. For example, the information integration portion 26 may perform the correction only by the first information or the second information.

Further, the above embodiment is described using an example in which the position measurement apparatus 10 includes the position measurement signal reception portion 11 and the object detection portion 12; however, the embodiment is not limited thereto. For example, the position measurement apparatus 10 may include, for example, another device that outputs detection information relating to information of the position, the attitude, and the like of the movable body M. The information integration portion 26 may correct the third information by the information of the position, the attitude, and the like of the movable body M acquired based on the detection information output from the other device.

A program for realizing all or some of the functions of the position measurement apparatus 10 in the embodiment of the present invention may be recorded in a computer-readable recording medium, the program recorded in the recording medium may be read into and executed by a computer system, and thereby, all or some of the processes performed by the position measurement apparatus 10 may be performed. It is assumed that the term "computer system" used herein includes an OS or hardware such as peripherals. It is also assumed that the term "computer system" includes a WWW system which includes a homepage-providing environment (or a display environment). The term "computer-readable recording medium" refers to a portable medium such as a flexible disk, a magneto-optical disk, a ROM, or a CD-ROM or a storage device such as a hard disk embedded in the computer system. It is also assumed that the term "computer-readable recording medium" includes a medium which holds a program for a given time such as a volatile memory (RAM) in the computer system which becomes a server or a client when a program is transmitted through a network such as the Internet or a communication line such as a telephone line.

The program may be transmitted from the computer system which stores the program in the storage device or the like, to another computer system through a transmission medium or through transmission waves in the transmission medium. The term "transmission medium" which transmits the program refers to a medium having a function of transmitting information that is, for example, a network (communication network) such as the Internet or a communication line such as a telephone line. The program may be a program for realizing some of the above-described functions. The program may be a so-called differential file (differential program) which can realize the above-described functions by a combination with a program already recorded in the computer system.

The embodiments of the present invention have been presented as examples and are not intended to limit the scope of the invention. The embodiments can be implemented in a variety of other modes, and various omissions, substitutions, and modifications can be made without departing from the scope of the invention. The embodiments and modifications thereof are included within the scope and gist of the invention and are also included within the scope of the invention described in the appended claims and equivalents thereof.

What is claimed is:

1. A position measurement apparatus, comprising:

an inertia detection portion, representative of at least one processor, that is provided on a movable body and outputs inertia information, wherein the inertia detection portion:

outputs first state information of a time series of the movable body by inertial navigation based on the inertia information;

outputs detection information relating to the first state information;

outputs second state information of the movable body by a position measurement based on the detection information;

forms a pose graph using the first state information and the second state information acquired at a same time as the first state information, the second state information relatively constraining the first state information in a predetermined zone of the time series, and that outputs a systematic error of the first state information by optimization of a loop confinement in the predetermined zone; and based on the systematic error, corrects an attitude of the moving body.

2. The position measurement apparatus according to claim 1, wherein the inertia detection portion controls a weighting of the first state information and the second state information in accordance with a length of the predetermined zone.

3. The position measurement apparatus according to claim 1, wherein the inertia detection portion executes at least one of a first position measurement process and a second position measurement process, the first position measurement process outputs the second state information by a position measurement based on a position measurement signal acquired from an outside, and the second position measurement process outputs the second state information by a position measurement based on point group information obtained in accordance with detection of an external object.

4. The position measurement apparatus according to claim 2, wherein the inertial detection portion executes at least one of a first position measurement process and a second position measurement process, the first position measurement process outputs the second state information by a position measurement based on a position measurement signal acquired from an outside, and the second position measurement process outputs the second state information by a position measurement based on point group information obtained in accordance with detection of an external object.

5. A position measurement method executed by an electronic device comprising a process part that acquires state information of a movable body, the position measurement method comprising:

outputting first state information of a time series of the movable body by inertial navigation based on inertia information that is output from an inertia detection portion provided on the movable body;

outputting second state information of the movable body by a position measurement based on detection information relating to the first state information;

forming a pose graph using the first state information and the second state information acquired at a same time as the first state information, the second state information relatively constraining the first state information in a predetermined zone of the time series, and outputting a systematic error of the first state information by optimization of a loop confinement in the predetermined zone; and based on the systematic error, correcting an attitude of the moving body.

6. A computer-readable non-transitory recording medium that includes a program causing a computer of an electronic device comprising a process part that acquires state information of a movable body to execute:

outputting first state information of a time series of the movable body by inertial navigation based on inertia information that is output from an inertia detection portion provided on the movable body;

outputting second state information of the movable body by a position measurement based on detection information relating to the first state information; and forming a pose graph using the first state information and the second state information acquired at a same time as the first state information, the second state information relatively constraining the first state information in a predetermined zone of the time series, and outputting a systematic error of the first state information by optimization of a loop confinement in the predetermined zone; and based on the systematic error, correcting an attitude of the moving body.

* * * * *